US010841701B2

United States Patent
Wu (10) Patent No.: US 10,841,701 B2
(45) Date of Patent: Nov. 17, 2020

(54) SYSTEMS AND METHODS FOR VEHICLE AUDIO SOURCE INPUT CHANNELS

(71) Applicant: Harman International Industries, Incorporated, Stamford, CT (US)

(72) Inventor: Hongjun Wu, Suzhou (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 16/537,288

(22) Filed: Aug. 9, 2019

(65) Prior Publication Data

US 2020/0053466 A1 Feb. 13, 2020

Related U.S. Application Data

(60) Provisional application No. 62/717,717, filed on Aug. 10, 2018.

(51) Int. Cl.
| | | |
|---|---|---|
| *H04R 5/04* | (2006.01) | |
| *B60Q 1/52* | (2006.01) | |
| *B60R 11/02* | (2006.01) | |
| *H04R 5/02* | (2006.01) | |

(52) U.S. Cl.
CPC ............. *H04R 5/04* (2013.01); *B60Q 1/52* (2013.01); *B60R 11/0217* (2013.01); *H04R 5/02* (2013.01); *H04R 2430/01* (2013.01); *H04R 2499/13* (2013.01)

(58) Field of Classification Search
CPC .. H04R 5/04; H04R 5/02; B60R 11/02; B60Q 1/52
USPC .............................. 381/86, 1, 17, 307; 701/2
See application file for complete search history.

(56) References Cited

U.S. PATENT DOCUMENTS

| | | | | |
|---|---|---|---|---|
| 2002/0145510 | A1* | 10/2002 | Kitamura ............... | G10K 15/02 340/384.71 |
| 2007/0127734 | A1 | 6/2007 | Brulle-Drews | |
| 2008/0318518 | A1* | 12/2008 | Coutinho ............... | H04H 20/62 455/3.06 |
| 2009/0167519 | A1* | 7/2009 | Kracker .................. | B60Q 5/00 340/475 |
| 2011/0010269 | A1* | 1/2011 | Ballard .................. | B60Q 5/008 705/26.41 |
| 2015/0201023 | A1* | 7/2015 | Kotab ..................... | H04L 65/60 709/208 |
| 2016/0345115 | A1 | 11/2016 | Paik | |
| 2017/0282790 | A1* | 10/2017 | Pan .......................... | B60T 7/22 |
| 2017/0291543 | A1* | 10/2017 | Goldman-Shenhar ... | B60Q 9/00 |
| 2018/0176707 | A1 | 6/2018 | Park | |

FOREIGN PATENT DOCUMENTS

KR 20080005036 U 10/2008

OTHER PUBLICATIONS

European Patent Office, Extended European Search Report Issued in Application No. 19190407.7, dated Nov. 22, 2019, Germany, 10 pages.

* cited by examiner

*Primary Examiner* — Melur Ramakrishnaiah
(74) *Attorney, Agent, or Firm* — McCoy Russell LLP (57) ABSTRACT

Generating sounds in a vehicle, including generating turn indicator/hazard warning lights (TI/HWL) sounds via a first channel, and generating additional sounds via a second channel, where the second channel is different than the first channel.

20 Claims, 6 Drawing Sheets

| Master (IHU)- Slave 0 (AUD) | | | | |
|---|---|---|---|---|
| Downstream | BG-Left | BG-Right | Warning/Notification Tones | Navi/Tel | Turn Indicator/HWL |

SYSTEMS AND METHODS FOR VEHICLE AUDIO SOURCE INPUT CHANNELS

CROSS REFERENCE TO RELATED APPLICATIONS

The present application claims priority to U.S. Provisional Application No. 62/717,717 entitled "SYSTEMS AND METHODS FOR A TURN INDICATOR AND HAZARD WARNING LIGHT AUDIO SOURCE INPUT CHANNEL", and filed on Aug. 10, 2018. The entire contents of the above-listed application are herein incorporated by reference for all purposes.

BACKGROUND

The disclosure relates to sounds, which may be output in a vehicle.

SUMMARY

Disclosed herein are systems and methods that add a new unique audio source input channel for a first sound via an Automotive Audio Bus and/or other digital and/or analog audio bus technology/infrastructure (A2B). In at least one example, the first sound may be a Turn Indicator and Hazard Warning Light (TI/HWL) sound. Further, the channel on which the TI/HWL sound is generated may be a separate channel from a channel through which additional sounds, including other warning sounds and media, are generated.

In previous systems (such as CX11 systems), all warning sounds and the TI/HWL have been presented on the same channel. For example, the warning sounds, including the TI/HWL, were presented via a single channel such as the FG2 channel. However, the inventors have recognized several issues with such previous approaches. As just one example, at times when suppression of the TI/HWL sound is expected due to a higher priority sound having control over the polyphonic chime, and at times for a warning which toggles in nature, the TI/HWL is presented intermittently. Such intermittent presentation of the TI/HWL may be annoying to the user, degrading a user experience.

Therefore, recognizing the above, inventors have developed systems and methods to at least partially address the above problems. In particular, the inventors have developed systems and methods to use a different sound generator for TI/HWL and a different sound generator for the rest of the warnings and have this shared with AUD (e.g., an audio system and/or a vehicle manufacturer-controlled system) on two different channels.

For example, the systems and methods may utilize a first sound generator for generating TI/HWL sounds via a first channel, and a second sound generator that is different from the first sound generator for generating the rest of the warning sounds on a second, different channel of an audio system. In addition to the rest of the warning sounds, other sounds such as media, navigation, and telephone/telematic sounds may be generated via the second sound generator via the second channel.

By streaming on two different channels a directionality of the sounds is advantageously maintained. For example, in a case where the turn indicators are ON and a warning for obstruction in the rear is being generated, the above approach of the inventors advantageously enables the AUD to easily be at a higher volume at the rear speakers for the obstruction in the rear warning sound compared to the front speakers for the turn indicator. The ability to easily generate a first sound from the front speakers at a lower volume than a second, different sound generated from the rear speakers may be particularly advantageous in the European market, for example, as it is mandatory to have seat belt-TI/HWL presented at the same time.

Figure 5:
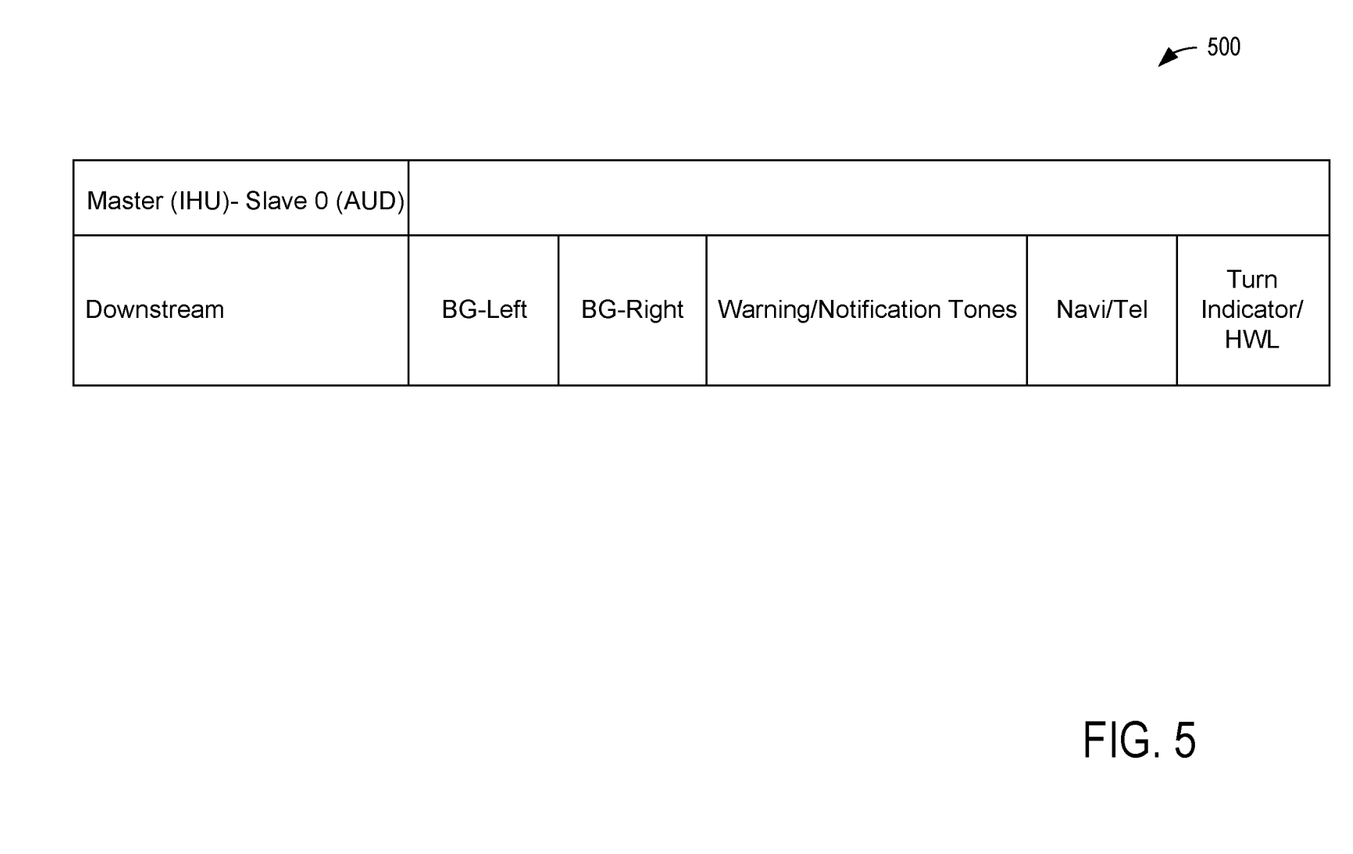
FIG. 5 shows a table of the IHU master to AUD downstream data format, according to at least one example of the present disclosure.

A change in the IHU (e.g., an in-vehicle computing system, such as an integrated head unit, and/or a related vehicle system) master to AUD downstream data format may be made as shown at table 500 in FIG. 5. A unique channel may be provided for turn indicator and Hazard lights to avoid mixed tones to the user, agree with the rest of the data format definition.

One new audio source channel (e.g., FG3) is separate from the rest of warning sounds to be treated like FG2 in CX11, having a duplicated EQ parameters same as FG2 (warning sounds). In contrast, all of the warning sounds and the TI/HWL sounds have been on the same channel in previous approaches.

In at least one example, there may be no mixing logic between TI/HWL (FG3) and the rest of warning sounds (FG2), and the TI/HWL may instead only be in the front right (FR) and front left (FL) speakers with fixed volume. The rest of the media/Navigation/Telephone/Telematics mixing may be in accordance to the mixing logic and may be managed by the IHU.

If the FG3 (e.g., TI/HWL) and FG2 (e.g., warning sound) come at the same time, the tones shall be mixed, keeping the TI/HWL at a fixed gain only on the FL and FR speakers, and the rest of the warning tones played based on the data provided by the IHU. In this way, the FG3 (e.g., TI/HWL) will be maintained at constant gain, and if a request is received to mute/attenuate, the FG3 will be managed by the IHU.

In a first example approach, the IHU sends following new controller area network (CAN) signals to AUD in order to control the FG3 (e.g., TI/HWL) separately from the FG2 (e.g., warning sound). In such examples, there may be a fixed volume step in which the FG3 (e.g., TI/HWL) is presented at the fixed volume. Then, if a request is received to mute/attenuate the FG3, the IHU will mute/attenuate the FG3 without a mute/unmute CAN signal being generated. Further, following the request to mute/attenuate the FG3, an output channel mask (e.g., FL and FR) is generated.

In a second example approach, both a fixed volume step and a fixed output channel (e.g., FL and FR) are fixed-defined in AUD software (SW), and mute/unmute of FG3 is not controlled via AUD. Thus, in this approach, every time changes are made to the fixed volume step or fixed output channel, then AUD needs to make a new version SW release (including SW change, integration test, validation test, etc.).

An advantage with the first example approach is that an unused signal may be used for the volume and attenuation plan, so that the volume and attenuation plan can be controlled via local configurations without the need for a change in the software. Thus, a benefit with the first example approach in which an unused CAN signal is found in the existing system is the ease in which the first example approach may be carried out. Further, as mentioned, the CAN signal may only be used for volume control and the mute/unmute may be managed by the IHU. In at least one example, all sources may need speed compensation, including the FG3.

DETAILED DESCRIPTION

As discussed above, the present disclosure relates at least in part to an approach for using a unique channel for a first sound, such as TI/HWL sounds, relative to the remaining sounds of the vehicle. For example, the remaining sounds may be one or more of the remaining warning sounds, media, navigation, telephone, telematics, etc. Via the methods and systems disclosed herein, intermittent toggling between the first sound (e.g., TI/HWL) and the remaining sounds (e.g., the remaining warning sounds) may be avoided.

Figure 1:
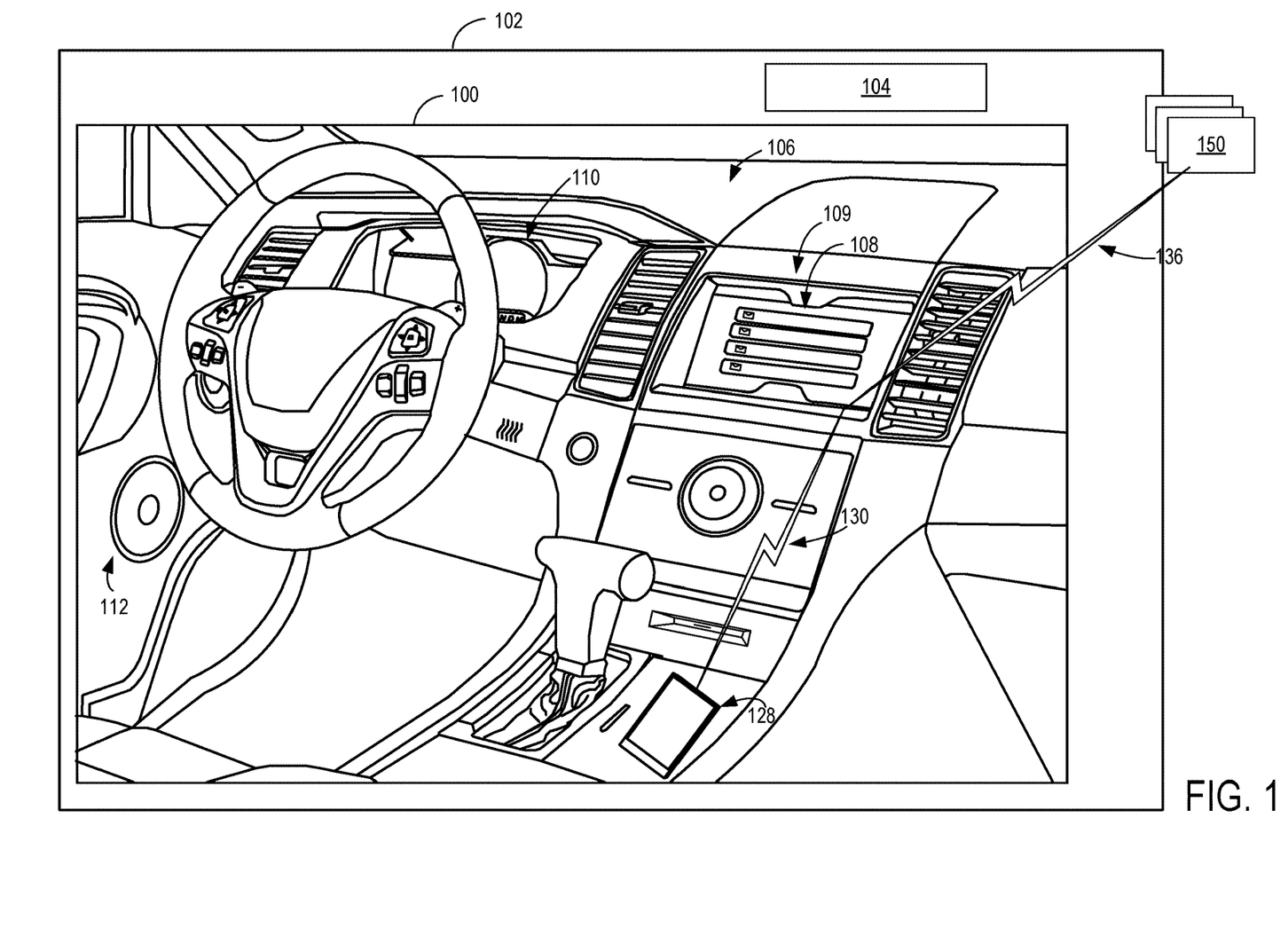
FIG. 1 shows an example partial view of a vehicle cabin in accordance with one or more embodiments of the present disclosure.
Figure 2:
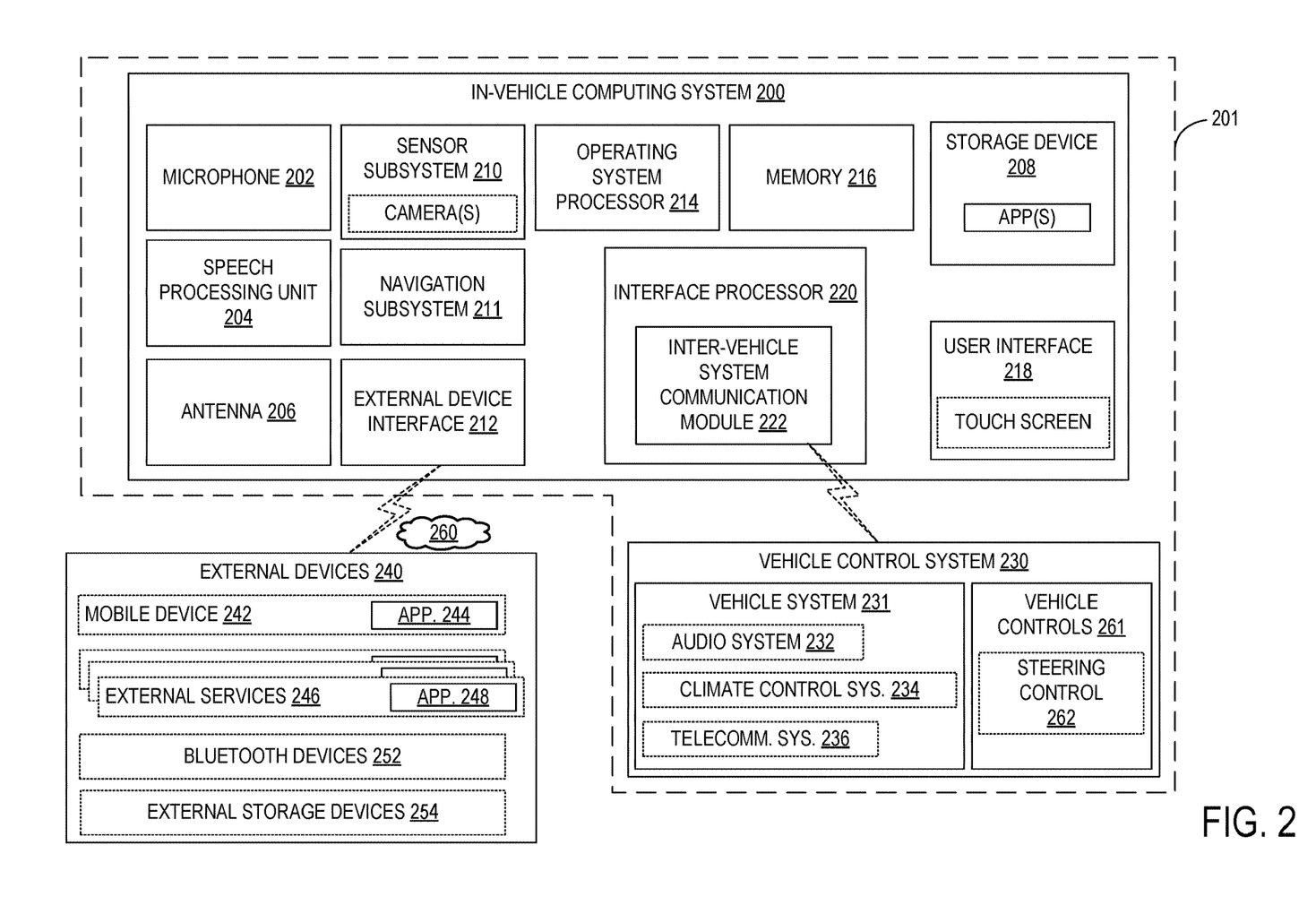
FIG. 2 shows an example in-vehicle computing system in accordance with one or more embodiments of the present disclosure.
Figure 3:
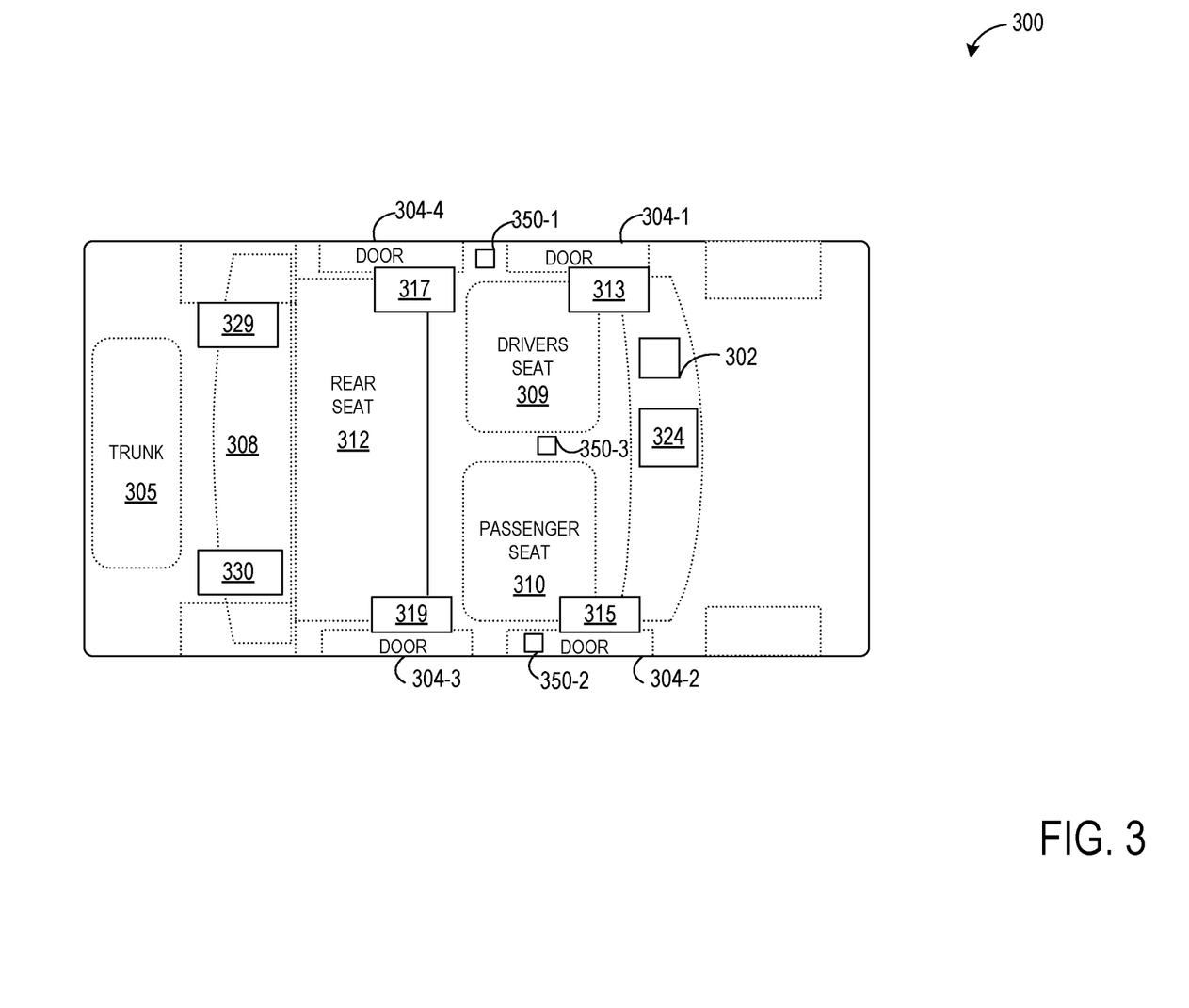
FIG. 3 shows an example sound processing system in a vehicle in accordance with one or more embodiments of the present disclosure.

As shown in FIGS. 1-3, a system according to the present disclosure may be part of a vehicle, and methods according to the present disclosure may be carried out via an in-vehicle computing system.

FIG. 1 shows an example partial view of one type of environment for an audio customization system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128. The audio system of the vehicle may include an amplifier (not shown) coupled to plurality of loudspeakers (not shown). In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct, Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine CAN bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/ sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, amplifier etc.) or other applications (e.g., navigational applications) of mobile device 242 to enable the requested data to be collected on the mobile device or requested adjustment made to the components. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/ sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via FR such as via antenna (s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

FIG. 3 is a block diagram of a vehicle 300 that includes an example audio or sound processing system (AS) 302, which may include any or a combination of the sound processing systems and methods described below. The vehicle 300 may be an example of vehicle 102 of FIG. 1. The vehicle 300 includes doors 304, a driver seat 309, a passenger seat 310, and a rear seat 311. While a four-door vehicle is shown including doors 304-1, 304-2, 304-3, and 304-4, the audio system (AS) 102 may be used in vehicles having more or fewer doors. The vehicle 300 may be an automobile, truck, boat, or the like. Although only one rear seat is shown, larger vehicles may have multiple rows of rear seats. Smaller vehicles may have only one or more seats. While a particular example configuration is shown, other configurations may be used including those with fewer or additional components.

The audio system 302 (which may include an amplifier and/or other audio processing device for receiving, processing, and/or outputting audio to one or more speakers of the vehicle) may improve the spatial characteristics of surround sound systems. The audio system 302 supports the use of a variety of audio components such as radios, COs, DVDs, their derivatives, and the like. The audio system 302 may use 2-channel source material such as direct left and right, 5.1 channel, 6.2 channel, 7 channel, 12 channel and/or any other source materials from a matrix decoder digitally encoded/decoded discrete source material, and the like. The audio system 302 utilizes a channel that is only for TI/HWL, sounds and is separate from a channel/s for remaining sounds, including one or more of remaining warning, media, navigational, and telephone/telematics sounds.

The amplitude and phase characteristics of the source material and the reproduction of specific sound field characteristics in the listening environment both play a key role in the successful reproduction of a surround sound field.

The audio system 302 may improve the reproduction of a surround sound field by controlling the amplitude, phase, and mixing ratio between discrete and passive decoder surround signals and/or the direct two-channel output signals, in at least one example. The amplitude, phase, and mixing ratios may be controlled between the discrete and passive decoder output signals. The spatial sound field reproduction may be improved for all seating locations by re-orientation of the direct, passive, and active mixing and steering parameters, especially in a vehicle environment.

The mixing and steering ratios as well as spectral characteristics may be adaptively modified as a function of the noise and other environmental factors. In a vehicle, information from the data bus, microphones, and other transduction devices may be used to control the mixing and steering parameters.

Further, as discussed above, a directionality of the TI/HWL sounds may be maintained with the TI/HWL being generated via the FR and FL speakers. In one or more examples, the TI/HWL sounds may also be maintained in the front center speaker.

The vehicle 300 has a front center speaker (CTR speaker) 324, a front left speaker (FL speaker) 313, a front right speaker (FR speaker) 315, and at least one pair of surround speakers.

The surround speakers may be a left side speaker (LS speaker) 317 and a right side speaker (RS speaker) 319, a left rear speaker (LR speaker) 329 and a right rear speaker (RR speaker) 330, or a combination of speaker sets. Other speaker sets may be used. While not shown, one or more dedicated subwoofers or other drivers may be present. Possible subwoofer mounting locations include the trunk 305, below a seat, or the rear shelf 308. The vehicle 300 may also have one or more microphones 350 mounted in the interior.

Each CTR speaker, FL speaker, FR speaker, LS speaker, RS speaker, LR speaker, and RR speaker may include one or more transducers of a predetermined range of frequency response such as a tweeter, a mid-range, or a woofer. The tweeter, mid-range, or woofer may be mounted adjacent to each other in essentially the same location or in different locations. For example, the FL speaker 313 may be a tweeter located in door 304-1 or elsewhere at a height roughly equivalent to a side mirror or higher. The FR speaker 315 may have a similar arrangement to FL speaker 313 on the right side of the vehicle (e.g., in door 304-2).

The LR speaker 329 and the RR speaker 330 may each be a woofer mounted in the rear shelf 308. The CTR speaker 324 may be mounted in the front dashboard 307, in the roof, on or near the rear-view mirror, or elsewhere in the vehicle 300. In other examples, other configurations of loudspeakers with other frequency response ranges are possible. In some embodiments, additional speakers may be added to an upper pillar in the vehicle to enhance the height of the sound image. For example, an upper pillar may include a vertical or near-vertical support of a car's window area. In some examples, the additional speakers may be added to an upper region of an "A" pillar toward a front of the vehicle.

Figure 4:
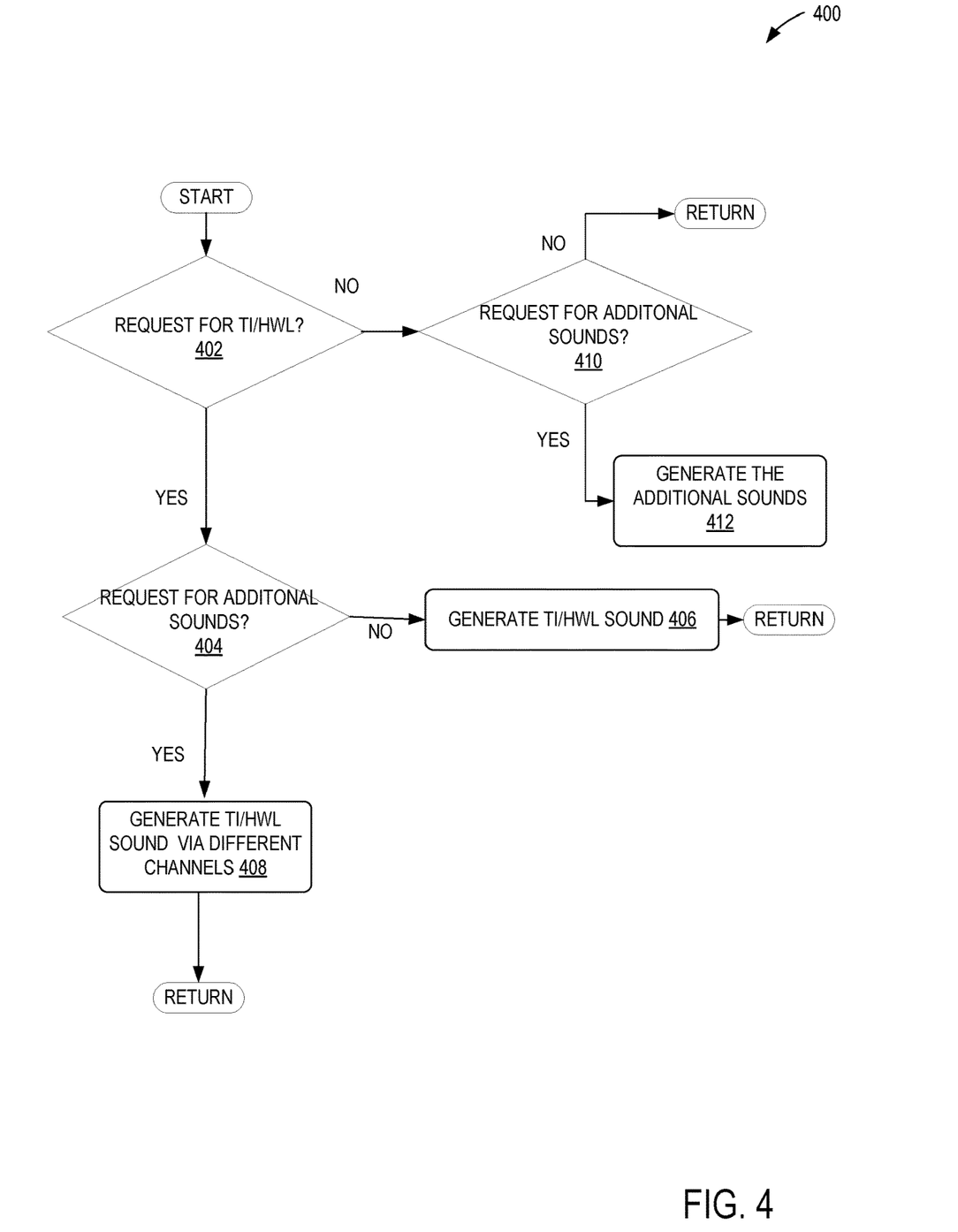
FIG. 4 shows a flow chart of a method according to at least one example of the present disclosure.

Turning now to FIG. 4, FIG. 4 shows a flow chart of a method 400 according to at least one example of the present disclosure. In at least one example, method 400 may be stored as instructions on a non-transitory storage devices, such as non-volatile storage device 208 and/or volatile memory 216 that are executable by a processor (e.g., operating system processor 214 and/or interface processor 220) to perform one or more of the actions described in the disclosure. For example, sound may be generated via one or more of the front, center, and rear speakers as described below.

Turning first to step 402 of method 400, step 402 includes determining whether a request for TI/HWL sound (also referred to herein as a first sound) is present. For example, a request for TI/HWL may be present if any of a right turn signal, a left turn signal, and hazard warning light request has been received. For example, the presence of a TI/HWL request may be detected responsive to a user input received. In some examples, the presence of a TI/HWL request may be present responsive to a position of a turn signal to request a left turn signal or a right turn signal, or responsive to depression of a hazard warning light button. A TI/HWL request may be determined as not being present if a turn signal is at a neutral position (a position indicated neither a left or right turn signal is desired) and lack of a hazard warning light request. For example, the hazard warning lights may be determined to not be requests if a hazard warning light button is not depressed (e.g., in a neutral position).

If the presence of a request for TI/HWL is determined at step 402, method 400 moves on to step 404. At step 404, it is determined whether additional sounds (also referred to herein as a second sound) are requested. For example, additional sounds may include remaining warning sounds. The remaining warning sounds may include a seatbelt undone warning or an obstruction warning, for example. The additional sounds may additionally or alternatively include any one or combination of media, navigation, and telephone/telematics sounds, for example.

If a request for additional sounds is not detected at step 404, then method 400 includes generating the TI/HWL sound at step 406. For example, the TI/HWL sound may be a clicking sound.

In one or more examples, when only the TI/HWL sounds are requested and additional sounds are not requested, the TI/HWL sounds may be generated by any of the speakers of the vehicle at step 406. For example, when only the TI/HWL sounds are requested, the TI/HWL sounds may be played in a default mode. The default mode may include all of the speakers, in some examples. In other examples, the default mode may include a predetermined selection of speakers and/or a set/subset of speakers selected based on user preferences and/or a current status of the vehicle (e.g., a number of passengers in the vehicle, a distribution of passengers in the vehicle, a number of obstacles detected by one or more sensors of the vehicle, etc.). Then, if the additional sounds are requested concurrently with a request for the TI/HWL sounds, a TI/HWL mode may be entered and the TI/HWL sounds may only be played by a first subset of speakers via a first channel, and the additional sounds may be played only by a second subset of the speakers via the second channel. For example, the first subset of speakers may be front speakers and the second subset of speakers may be rear speakers.

However, in at least one example, the TI/HWL sounds may only be generated via the first subset of the speakers at step 406 of the vehicle that are different from the second subset of speakers which play the additional sounds, whether or not concurrent request for the TI/HWL sounds and the additional sounds is requested.

If a request for additional sounds is detected at step 404, method 400 includes generating TI/HWL sounds and generating the additional sounds through different channels at step 408. For example, the TI/HWL sounds may be generated via the first channel and the additional sounds may be generated via the second channel, where the first channel and the second channel are separate from one another. In at least one example, the TI/HWL sounds may be generated by the front speakers via the first channel. The front speakers may include one or more of the FR, FL, and CTR speakers, for example. In some examples, the TI/HWL sounds may only be generated by the FR and FL speakers. The additional sounds may be generated via the second channel, where the second channel is separate from the first channel. The additional sounds may be generated by the rear speakers via the second channel, for example. Thus, in this way, the technical effect of avoiding undesirable mixing of tones may be achieved. For example, mixing of clicking tones which may be used as the TI/HWL sounds may not need to be mixed with tones of the additional sounds.

Moving back to step 402, if a request for the TI/HWL is not present at step 402, then method 400 may move to step 410 where it is determined whether there is a request for additional sounds. The additional sounds may include any or combination of the additional sounds as described above, such as the remaining warning sounds, media, navigational, and telephone/telematics sounds. If there is a request for additional sounds at step 410, method 400 may include generating the additional sounds at step 412.

In one or more examples, when only the additional sounds are requested and a TI/HWL sounds are not requested, the additional sounds may be generated by any of the speakers of the vehicle at step 412. For example, when only the additional sounds are requested, the additional sounds may be played in a default mode. The default mode may include all of the speakers, in some examples. In other examples, the default mode may include a predetermined selection of speakers and/or a set of speakers selected based on user preferences and/or a current status of the vehicle (e.g., a number of passengers in the vehicle, a distribution of passengers in the vehicle, a number of obstacles detected by one or more sensors of the vehicle, etc.). Then, if TI/HWL sounds are requested concurrently with a request for the additional sounds, a TI/HWL mode may be entered and the additional sounds may be played only by a subset of the speakers via the second channel, such as only by the rear speakers.

However, in at least one example, the additional sounds may only be generated via a subset of the speakers at step 412 of the vehicle that are different from the TI/HWL speakers, whether or not TI/HWL sounds are being generated.

Figure 6:
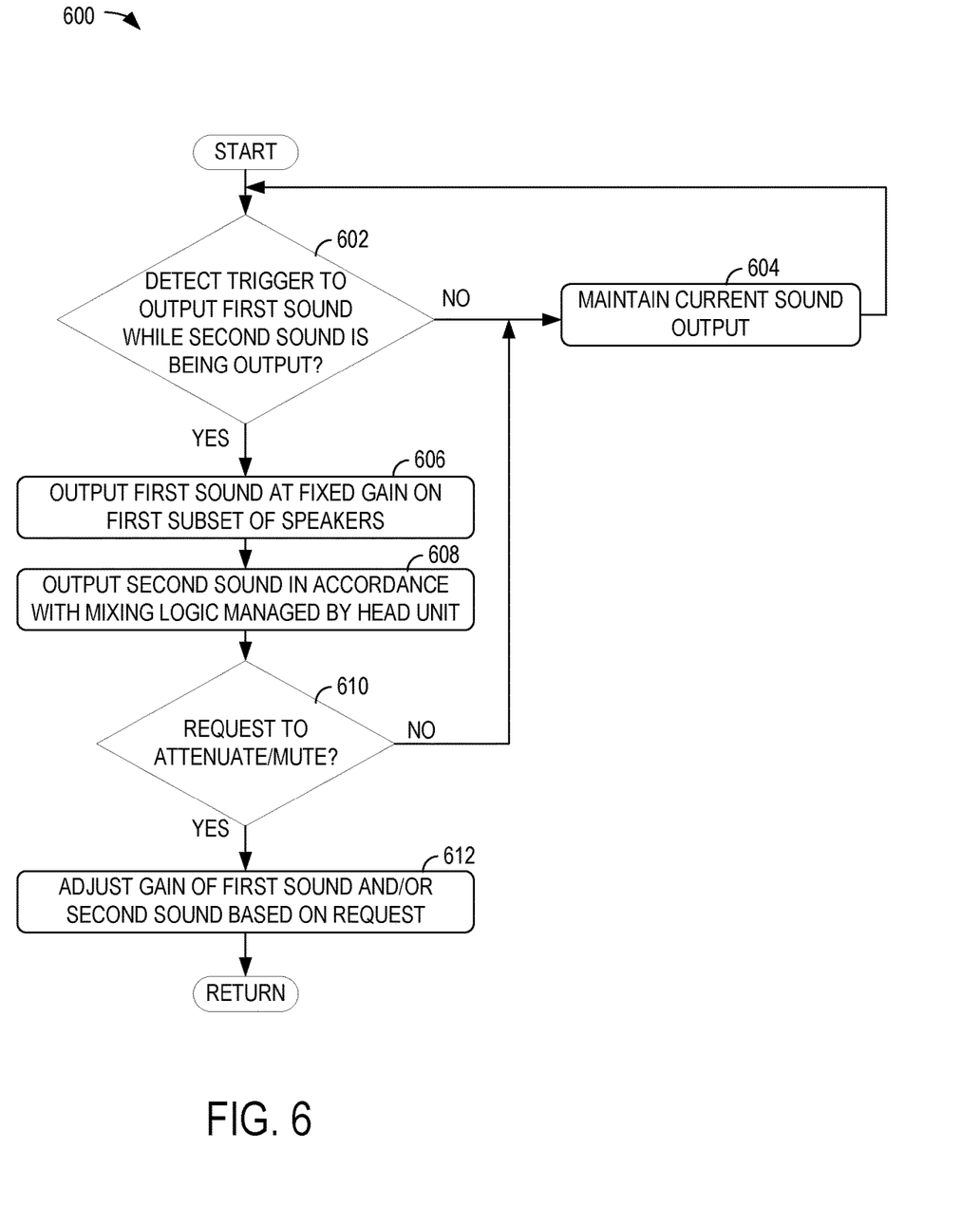
FIG. 6 shows a flow chart of an example method of providing sound output.

FIG. 6 shows a flow chart for an example method 600 for adjusting audio output (e.g., in a vehicle, such as one of the above-described vehicles). Method 600 may be performed by a computing system and/or combination of computing systems, which may include one or more computing systems integrated in a vehicle. For example, method 600 may be performed by executing instructions stored in memory of an in-vehicle computing system (e.g., in-vehicle computing system 109 of FIG. 1 and/or in-vehicle computing system 200 of FIG. 2) alone or in combination with one or more other vehicle systems (e.g., audio controllers, CAN buses, engine controllers, etc.).

At 602, the method includes determining whether a trigger to output a first sound while a second sound is being output is detected. It is to be understood that "while a second sound is being output" may also refer to a simultaneous or near-simultaneous request to output a second sound, and/or any other trigger that, if executed, would result in the first and second sound being output simultaneously. In some examples, the first sound may include a turn indicator sound (e.g., a tone output while a turn indicator is active in a vehicle and/or a tone output after a turn indicator of a vehicle has been on for a threshold period of time) and/or a headlight warning light sound (e.g., a tone output responsive to a state of headlights of a vehicle—such as a sound output when the headlights are left on after engine shutoff, after a driver unbuckles a seatbelt, after a door is opened, and/or after any indication that the driver may be leaving the vehicle while the headlights are left on; and/or a sound output when the headlights are not turned on during environmental conditions that would benefit from headlights—such as fog, rain, snow, darkness/night time, etc.). The second sound may include any other warning sound, media sound, telematics sound, navigation sound, and/or any other sound (e.g., one or more of which may be controlled by the in-vehicle computing system). It is to be understood that the above description of the first sound may alternatively be attributed to the second sound for the purposes of the method (e.g., the method may include, at 602, determining if a trigger to output another warning indicator sound is received while a turn indicator warning sound is being output).

If the above-described trigger is not detected (e.g., "NO" at 602), the method includes maintaining a current sound output, as indicated at 604. For example, no sound adjustments may be made until an associated trigger or request to adjust sound output is received.

If the above-described trigger to output a first sound while a second sound is being output is detected (e.g., "YES" at 602), the method includes outputting the first sound at a fixed gain (e.g., a fixed volume) on a first subset of speakers at 606. For example, the fixed gain may be a predetermined gain that is stored in memory of one or more of the computing systems of a vehicle. The first subset of speakers may include a predefined one or more speakers of a vehicle in some examples (e.g., a front right and front left speaker in the vehicle). For example, an output channel mask may be used to direct the output of the first sound to selected speakers. The setting of the fixed gain/volume may be performed by an audio system, in-vehicle computing system, and/or other vehicle system. At 608, the method includes outputting a second sound in accordance with mixing logic maintained by a head unit (e.g., an in-vehicle computing system). For example, the setting of the volume and/or speaker output of the first sound may be handled by a different system than the application of the mixing logic and output of the second sound.

At 610, the method includes determining if a request to attenuate and/or mute the first sound and/or the second sound is received. If the request is not received (e.g., "NO" at 610, the method includes maintaining a current sound output (e.g., the sound output performed at 606 and 608, without making further adjustments), as indicated at 604. If a request to attenuate/mute is received (e.g., "YES" at 610), the method includes adjusting a gain of the first sound and/or the second sound based on the request. In some examples, a command to perform the requested attenuation and/or muting may be sent via a CAN signal to associated vehicle systems. In other examples, an in-vehicle computing system may handle the attenuation/muting according to the request (e.g., without the CAN signal). In still other examples, both of the above approaches may be used to perform the requested attenuation/muting (e.g., the in-vehicle computing system may control a signal to be sent on a CAN bus).

Thus provided herein are methods and systems for generating sounds in a vehicle. In a first example method, turn indicator/hazard warning lights (TI/HWL) sounds are generated via a first channel, and additional sounds are generated via a second channel, where the second channel is different than the first channel. In one or more examples, the TI/HWL sounds may only generated via a first subset of speakers of the vehicle, and the additional sounds may only generated via a second subset of the speakers of the vehicle. In one or more of the example methods, the first subset of speakers may be front speakers, and the second subset of speakers may be rear speakers.

At least one example sound system of a vehicle disclosed herein may include a first subset of speakers, a second subset of speakers, and a controller including instructions stored in non-transitory memory that are executable by a processor for, responsive to receiving a request for a turn indicator/hazard warning lights (TI/HWL) sounds at a same time that additional sounds are requested, generate the TI/HWL sounds with the first subset of speakers via a first channel, and generate the additional sounds with the second subset of speakers via a second channel. In one more examples, the first subset of speakers may be front speakers, and wherein the second subset of speakers may be rear speakers.

Thus, described herein are methods and systems for generating sounds in a vehicle. In a first approach according to the present disclosure, a first example method for generating sounds in a vehicle comprises generating turn indicator/hazard warning lights (TI/HWL) sounds via a first channel, and generating additional sounds via a second channel, where the second channel is different than the first channel. In a second example method, which optionally includes the first method, the TI/HWL sounds are only generated via a first subset of speakers of the vehicle. In a third example method, which optionally includes one or both the first and second example methods, the additional sounds are only generated via a second subset of the speakers of the vehicle. In a fourth example method, which optionally includes one or more of the first through third example methods, the first subset of speakers are front speakers, and the second subset of speakers are rear speakers. In a fifth example method, which optionally includes one or more of the first through fourth example methods, the TI/HWL sounds are generated via the first channel and the additional sounds are generated via the second channel responsive to receiving a request for the (TI/HWL) sounds to be generated concurrently with the additional sounds. A sixth example method, which optionally includes one or more of the first through fifth example methods, further comprises, responsive to only the additional sounds being requested and the TI/HWL sounds not being requested, generating the additional sounds by any of the first subset of speakers and the second subset of speakers. In a seventh example method, which optionally includes one or more of the first through sixth example methods, the additional sounds include any one or combination of media, navigation, and telephone sounds. In an eighth example method, which optionally includes one or more of the first through seventh example methods, the TI/HWL, sounds are generated at a fixed gain, the fixed gain being a predetermined gain that is stored in memory of one or more computing systems of the vehicle.

Further disclosed herein is a sound system of a vehicle comprising a first subset of speakers, a second subset of speakers, and a controller including instructions stored in non-transitory memory that are executable by a processor for performing any one of the example methods disclosed herein. In a first example system, the instructions may be executable for, responsive to receiving a request for a first sound at a same time that a second sound is requested, generating the first sound with the first subset of speakers via a first channel, and generating the second sound with the second subset of speakers via a second channel. In a second example system, which optionally includes the first example system, the first subset of speakers are front speakers. In a third example system, which optionally includes one or both the first example system and the second example system, the second subset of speakers are rear speakers. In a fourth example system, which optionally includes any one or more of the first through third example systems, the instructions further include, responsive to only the second sound being requested and the first sound not being requested, generating the second sound by any of the first subset of speakers and the second subset of speakers. In a fifth example system, which optionally includes any one or more of the first through fourth example systems, the first sound is an indicator/hazard warning lights (TI/HWL) sound.

In another approach according to the present disclosure, which optionally includes the first approach, a first example method for generating sounds in a vehicle comprises, responsive to receiving a request for a first sound at a same time that a second sound is already requested, generating a first sound via a first channel simultaneously with generating a second sound via a second channel, wherein the second channel is different than the first channel. In a second example method, which optionally includes the first example method, the first channel is a first subset of speakers, and wherein the second channel is a second subset of speakers that is different that the first subset of speakers. In a third example method, which optionally includes one or both of the first and second example methods, the first subset of speakers includes at least one speaker positioned in a front region of the vehicle. In a fourth example method, which optionally includes one or more of the first through third example methods, the first sound is generated at a fixed volume, the fixed volume being a predetermined volume stored in memory of one or more computing systems of the vehicle, and wherein the fixed volume at which the first sound is being generated is overridden to adjust a volume at which the first sound is generated responsive to receiving a user request. In a fifth example method, which optionally includes one or more of the first through the fourth example methods, the fixed volume is only overridden responsive to the user request being received while the first sound is being generated. In a sixth example method, which optionally includes one or more of the first through the fifth example methods, adjusting the volume of the first sound includes muting the first sound. In a seventh example method, which optionally includes one or more of the first through the sixth example methods, the first sound is an indicator/hazard warning lights (TI/HWL) sound, and the second sound is an additional sound that is different than the TI/HWL sound.

The description of embodiments has been presented for purposes of illustration and description. Suitable modifications and variations to the embodiments may be performed in light of the above description or may be acquired from practicing the methods. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for generating sounds in a vehicle, comprising:
    generating turn indicator/hazard warning lights (TI/HWL) sounds via a first channel, wherein the first channel is only for generating the TI/HWL sounds; and
    generating remaining additional sounds via a second channel, where the second channel is different than the first channel, and wherein the remaining additional sounds include other warning sounds.

2. The method of claim 1, wherein the TI/HWL sounds are only generated via a first subset of speakers of the vehicle.

3. The method of claim 2, wherein the remaining additional sounds are only generated via a second subset of the speakers of the vehicle.

4. The method of claim 2, wherein the first subset of speakers is front speakers, and wherein the second subset of speakers is rear speakers.

5. The method of claim 1, wherein the TI/HWL sounds are generated via the first channel and the remaining additional sounds are generated via the second channel responsive to receiving a request for the sounds to be generated concurrently with the remaining additional sounds.

6. The method of claim 3, further comprising, responsive to only the remaining additional sounds being requested and the TI/HWL sounds not being requested, generating the remaining additional sounds by any of the first subset of speakers and the second subset of speakers.

7. The method of claim 1, wherein the remaining additional sounds further include any one or combination of media, navigation, and telephone sounds.

8. The method of claim 1, wherein the TI/HWL sounds are generated at a fixed gain, the fixed gain being a predetermined gain that is stored in memory of one or more computing systems of the vehicle.

9. A sound system of a vehicle, comprising:
    a first subset of speakers;
    a second subset of speakers; and
    a controller including instructions stored in non-transitory memory that are executable by a processor for:
        responsive to receiving a request for a first sound at a same time that a second sound is requested, generating the first sound at a predetermined fixed gain with the first subset of speakers via a first channel, and generating the second sound with the second subset of speakers via a second channel based on application of mixing logic,
        wherein the fixed gain is set via a different system than a system that carries out the application of the mixing logic.

10. The system of claim 9, wherein the first subset of speakers is front speakers.

11. The system of claim 10, wherein the second subset of speakers is rear speakers.

12. The system of claim 9, wherein the instructions further include, responsive to only the second sound being requested and the first sound not being requested, generating the second sound by any of the first subset of speakers and the second subset of speakers.

13. The system of claim 9, wherein the first sound is a turn indicator/hazard warning lights (TI/HWL) sound.

14. A method for generating sounds in a vehicle, comprising:
    responsive to receiving a request for a first sound at a same time that a second sound is already requested,
        generating a first sound at a predetermined fixed gain via a first channel while simultaneously generating a second sound via a second channel,
        wherein the second channel is different than the first channel,
        wherein the first sound is a turn indicator/hazard warning lights (TI/HWL) sound,
        wherein the first channel is only for generating the TI/HWL sound, and
        wherein the fixed gain is set via a different system than a system that carries out application of mixing logic, and wherein the system that carries out the application of the mixing logic is an in-vehicle computing system.

15. The method of claim 14, wherein the first channel is a first subset of speakers, and wherein the second channel is a second subset of speakers that is different than the first subset of speakers.

16. The method of claim 15, wherein the first subset of speakers includes at least one speaker positioned in a front region of the vehicle.

17. The method of claim 15, wherein the predetermined fixed gain is a fixed volume stored in memory of one or more computing systems of the vehicle, and wherein the fixed volume at which the first sound is being generated is overridden to adjust a volume at which the first sound is generated responsive to receiving a user request.

18. The method of claim 17, wherein the fixed volume is only overridden responsive to the user request being received while the first sound is being generated.

19. The method of claim 17, wherein adjusting the fixed volume of the first sound includes muting the first sound.

20. The method of claim 15, wherein the second sound is an additional sound that is different than the TI/HWL sound.

* * * * *